UNITED STATES PATENT OFFICE 2,576,230

AMINOALKYL ESTERS OF $\alpha,\beta,\beta$-TRIARYL-PROPIONIC ACIDS

Carl Peter Krimmel, Evanston, Ill., assignor to G. D. Searle & Co., Skokie, Ill., a corporation of Illinois No Drawing. Application February 20, 1948, Serial No. 9,963

9 Claims. (Cl. 260—472)

This invention relates to aminoalkyl esters of $\alpha,\beta,\beta$-triarylpropionic acids, to salts thereof, and to processes of producing such esters and salts. More specifically, this invention relates to new compositions of matter and to the production thereof, said compositions of matter having the following general structural formula

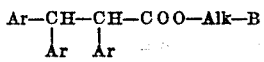

wherein Ar represents an aromatic radical, Alk represents an alkylene radical and B represents a nonaromatic amino radical.

In the foregoing general formula, the aromatic radical, Ar, is a radical of the benzene series and includes the phenyl, tolyl, xylyl and related monocyclic aromatic hydrocarbon groups, as well as halogenated, nitrated and alkoxylated benzenoid radicals such as chlorophenyl, bromophenyl, anisyl, phenetyl, chlorotolyl and the like. The alkylene radical, Alk, is a bivalent radical derived from a saturated hydrocarbon radical. It includes the ethylene, propylene, trimethylene, tetramethylene, 1,2-butylene, 1,3-butylene, 2,3-butylene and related amylene radicals. It is preferable that there be two or three carbon atoms between the carboxyl and amino groups, although this is not an essential feature; compounds with four or five carbon atoms between the foregoing groups are also suitable. The basic group, B, is a secondary or tertiary amino group which is aliphatic in character. It can be a mono- or dialkylamino group as, for example, a methylamino, isopropylamino, methylpropylamino, dibutylamino, diamylamino or methylhexylamino group. The alkyl radicals may be straight or branched chained. When the amino group is a dialkylamino group, the alkyl radicals may be the same or different. The number of carbon atoms in the mono- or dialkylamino radical can range from one to ten. B also represents aliphatic-type heterocyclic amino groups such as the morpholino, piperidino, pyrrolidino, thiamorpholino, piperazino, lupetidino and related non-aromatic cyclic amino radicals. It further can stand for hydroxyalkylamino radicals such as ethanolamino, diethanolamino, isopropanolamino, propanolamino, methylethanolamino, as well as lower acyl derivatives of such amino groups. It is therefore seen that the amino group, B, is derived from a tertiary aliphatic-type amine, that is, a primary or secondary amine which is non-aromatic and which has an ionization constant of the order of $10^{-3}$ to $10^{-6}$.

My invention is further illustrated by the following compounds, which are typical of those within its scope.

A. $\beta$-Dimethylaminoethyl $\alpha,\beta,\beta$ - triphenylpropionate, which has the formula

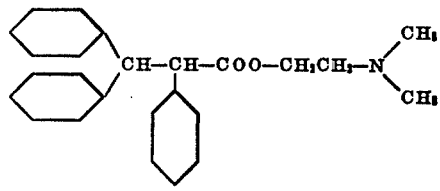

B. $\beta,\beta$-Dimethyl-$\gamma$-dimethylaminopropyl $\alpha,\beta,\beta$-triphenylpropionate, of the formula

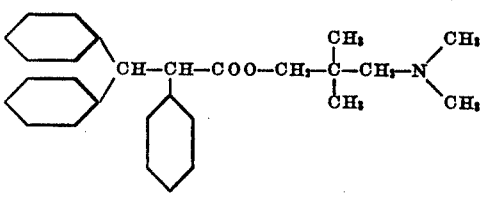

C. $\beta$ - Diethylaminoethyl $\alpha,\beta,\beta$ - triphenylpropionate, which has the formula

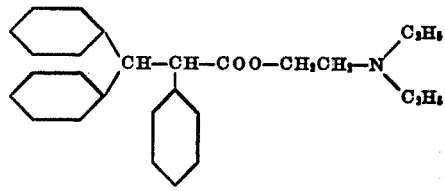

D. $\beta$ - Diethylaminobutyl $\alpha,\beta,\beta$ - triphenylpropionate, having the formula

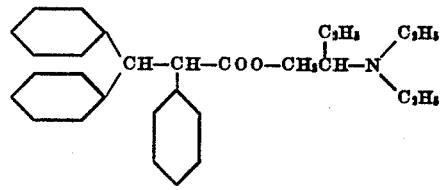

E. $\beta$ - Methylethylaminoethyl $\alpha,\beta,\beta$ - triphenylpropionate, which has the formula

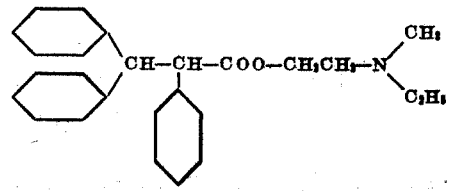

F. β-Piperidinoethyl α,β,β-triphenylpropionate hydrochloride, which has the formula

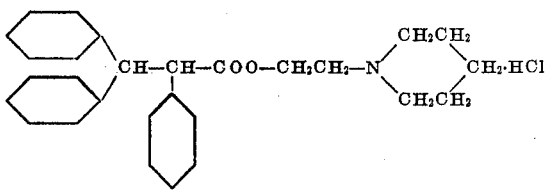

G. β-Morpholinoethyl α,β,β-triphenylpropionate, of the formula

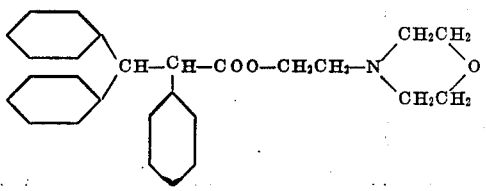

H. β-Diethylaminopropyl α,β,β-triphenylpropionate, having the formula

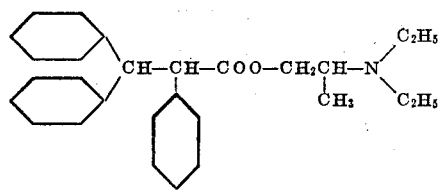

I. δ-Dimethylaminobutyl α,β,β-triphenylpropionate, which has the formula

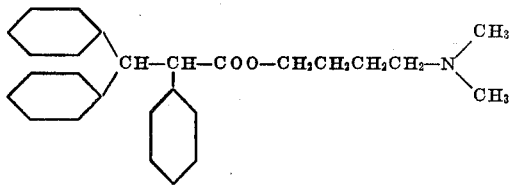

J. γ-Diethylaminopropyl α,β,β-triphenylpropionate, of the formula

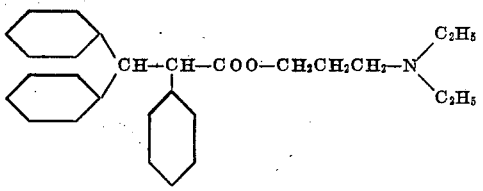

K. β-(2-heptylamino)ethyl α,β,β-triphenylpropionate, having the formula

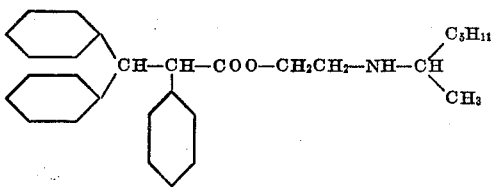

The substances which comprise my invention can be produced by heating an aminoalkyl halide of the formula B—Alk—X, wherein B and Alk have the meanings given hereinabove and X represents halogen, preferably chlorine or bromine, with an α,β,β-triarylpropionic acid, preferably in an inert solvent such as isopropanol, acetone, methyl ethyl ketone, benzene, toluene, butanol, ethanol, xylene and related substances. In practice it has been found desirable to use 1 mole of acid per mole of aminoalkyl halide, although excesses of either reagent are not undesirable. The first reaction is probably that of neutralization of the acid by the amino radical. On heating this salt rearranges to the desired basic ester salt, i. e., to an aminoalkyl α,β,β-triarylpropionate hydrohalide. Often this salt crystallizes from the chilled reaction mixture and can be readily separated and purified. In other cases the basic ester can be separated by conventional methods, as for instance, neutralization, extraction, and distillation. The foregoing processes are preferred methods for preparing those esters wherein the alkylene radical, Alk, has two or three carbon atoms between the carboxyl and amino radicals. For substances having alkylene radicals having four or more carbon atoms between the carboxyl and amino groups, it is more efficient to react an α,β,β-triarylpropionyl halide with the amino alcohol, B—Alk—OH, wherein B and Alk have the meanings already discussed. By this procedure the desired basic esters are obtained directly. For this esterification procedure neutral or basic inert solvents such as benzene, toluene, carbon tetrachloride, dioxane, pyradine, dimethylaniline, quinoline and the like are satisfactory.

The organic bases of the type contemplated in this application are soluble in common organic solvents but generally insoluble in water. For the purpose of water solubility, they are preferably converted to salts with organic and inorganic acids, such as sulfuric, phosphoric, citric, tartaric, sulfamic, lactic, acetic, malic, maleic, hydrochloric, hydrobromic, succinic, and the like. They may also be converted to quaternary ammonium salts by treatment with a reactive organic ester such as methyl iodide, ethyl bromide, methyl chloride, ethylene chlorohydrin, propylenebromohydrin, γ-chloropropanol, benzyl chloride, dimethyl sulfate, methyl toluenesulfonate, and the like. The addition salts of the bases with acids have the same physiologic properties as the free bases and are equally desirable from a therapeutic point of view. It is understood that the appended claims read on the basic esters defined therein whether they be in the form of the free bases or salts thereof.

The substances which comprise this invention are of value as medicinal agents. They are in general useful antispasmodic, analgesic, antihistaminic and anesthetic agents. They are also valuable agents for eliciting coronary dilatation. Their quaternary ammonium salts are surface-active substances having antiseptic and other valuable properties.

My invention is disclosed in more detail by the following examples, which are provided for the purpose of illustrating specific embodiments of the invention, but which are not to be construed as limiting the invention in spirit or in scope. The relative amounts of materials are given in parts by weight.

*Example 1*

64 parts of sodium metal are dissolved in 3160 parts of cold anhydrous isopropanol. 404 parts of β-dimethylaminoethyl chloride hydrochloride dissolved in 3840 parts of cold anhydrous isopropanol are added with agitation to the solution of sodium isopropoxide in isopropanol. Then 840 parts of α,β,β-triphenylpropionic acid are added, and the resulting mixture is agitated and refluxed for 5 hours. The hot solution is filtered to remove sodium chloride, and the filtrate is evaporated under reduced pressure. The residue is diluted with water, which causes the formation of a heavy white precipitate. The mass is made alkaline with aqueous alkali and ice. The resulting yellow oily layer is separated, and the aqueous layer is extracted with ether. The ether extract and the oily layer are agitated thoroughly with 40% hydrochloric acid. At the interface between the ether and aqueous acid phases there forms an ether-insoluble layer. This layer is separated, dried with anhydrous potassium carbonate, and distilled under reduced pressure. $\beta$-Dimethylaminoethyl $\alpha,\beta,\beta$-triphenylpropionate (Compound A) is a pale yellow, very viscous syrup distilling at 195–205° centigrade at 0.8 millimeter pressure. On standing it crystallizes. After recrystallization from petroleum ether it melts at 61–69° C.

A solution of this base in anhydrous ether is treated with anhydrous hydrogen chloride in isopropanol. A white precipitate of $\beta$-dimethylaminoethyl $\alpha,\beta,\beta$-triphenylpropionate hydrochloride is obtained. This salt, after recrystallization from isopropanol, melts at 230–232° C.

By the use of 521 parts of $\beta,\beta$-dimethyl-$\gamma$-dimethylaminopropyl chloride hydrochloride in place of the 404 parts of $\beta$-dimethylaminoethyl chloride hydrochloride in the foregoing process, there is obtained $\beta,\beta$-dimethyl-$\gamma$-dimethylaminopropyl $\alpha,\beta,\beta$-triphenylpropionate (Compound B).

Example 2

32 parts of sodium metal dissolved in 1960 parts of anhydrous isopropanol are mixed with a solution of 241 parts of $\beta$-diethylaminoethyl chloride hydrochloride in 1960 parts of anhydrous isopropanol. Then 420 parts of $\alpha,\beta,\beta$-triphenylpropionic acid are added and the mixture is refluxed and agitated for 3 hours. The hot mixture is filtered, and the filtrate is evaporated under reduced pressure. The residue is poured into 50% aqueous caustic soda solution and extracted with ether. The ether extract is dried with potassium carbonate, filtered and evaporated. The residue of $\beta$-diethylaminoethyl $\alpha,\beta,\beta$-triphenylpropionate (Compound C) is distilled at 225–230° C. at 1.7 mm. pressure. After standing for several days the ester crystallizes in clusters of square plates.

A solution of 568 parts of the foregoing base in 790 parts of anhydrous isopropanol is added to 156 parts of 88% phosphoric acid diluted with 400 parts of anhydrous isopropanol. The reaction mixture is heated for 10 minutes to 90–100° C., and the resulting white precipitate of $\beta$-diethylaminoethyl $\alpha,\beta,\beta$-triphenylpropionate phosphate is collected on a filter, washed and dried.

If, in place of $\beta$-diethylaminoethyl chloride, there is used 280 parts of $\beta$-diethylaminobutyl chloride hydrochloride, there is obtained by the foregoing method $\beta$-diethylaminobutyl $\alpha,\beta,\beta$-triphenylpropionate (Compound D). By a similar process, using 220 parts of $\beta$-methylethylaminoethyl chloride hydrochloride, one obtains $\beta$-methylethylaminoethyl $\alpha,\beta,\beta$-triphenylpropionate (Compound E).

Example 3

A solution of 276 parts of $\beta$-piperidinoethyl chloride hydrochloride in 1960 parts of cold anhydrous isopropanol is added to a solution of 35 parts of metallic sodium in 1960 parts of cold anhydrous isopropanol. Then 454 parts of $\alpha,\beta,\beta$-triphenylpropionic acid are added. The mixture is refluxed and agitated for 5 hours, and then filtered hot. The chilled filtrate gives a heavy precipitate. This is removed by filtration and recrystallized from ethanol, using decolorizing charcoal, and melts at 219–222° C. This product is $\beta$-piperidinoethyl $\alpha,\beta,\beta$-triphenylpropionate hydrochloride (Compound F).

By refluxing a solution of 454 parts of $\alpha,\beta,\beta$-triphenyl propionic acid in 3920 parts of isopropanol containing $\beta$-morpholinoethyl chloride (prepared by adding a solution of 35 parts of sodium in 1960 parts of anhydrous isopropanol to a solution of 280 parts of $\beta$-morpholinoethyl chloride hydrochloride in 1960 parts of anhydrous isopropanol) for 5 hours, evaporating the reaction mixture under reduced pressure, treating the residue with aqueous alkali, extracting the organic layer and drying and concentrating the extract, there is obtained $\beta$-morpholinoethyl $\alpha,\beta,\beta$-triphenylpropionate (Compound G).

Example 4

400 parts of $\alpha,\beta,\beta$-triphenylpropionic acid are treated with 490 parts of thionyl chloride and heated to 100° C. for 1 hour. The excess thionyl chloride is removed under vacuum, and the $\alpha,\beta,\beta$-triphenylpropionyl chloride crystallizes on standing.

To 416 parts of $\alpha,\beta,\beta$-triphenylpropionyl chloride dissolved in 870 parts of anhydrous toluene are added over a period of 10 minutes 170 parts of $\beta$-diethylaminopropanol. The solution is refluxed for 1 hour and chilled. Crystals of $\beta$-diethylaminopropanol hydrochloride separate. These are removed by filtration, and the filtrate is evaporated under reduced pressure. The residue is dissolved in 4000 parts of water containing a small amount of hydrochloric acid. The resulting acid solution is extracted to remove neutral material. The aqueous solution is made alkaline and extracted with ether. The ether extract is dried and evaporated. The residue of $\beta$-diethylaminopropyl $\alpha,\beta,\beta$-triphenylpropionate (Compound H) is distilled at 195–210° C. at 0.5 mm. pressure.

416 parts of the foregoing base and 192 parts of citric acid are heated in 780 parts of absolute ethanol at 100° C. After the reagents dissolve, the alcohol is removed by evaporation, and the residue is dissolved in 5470 parts of distilled water. There is obtained in this manner a 10% aqueous solution of $\beta$-diethylaminopropyl $\alpha,\beta,\beta$-triphenylpropionate citrate.

By a method analogous to the foregoing esterification process, using 152 parts of $\delta$-dimethylaminobutanol instead of 170 parts of $\beta$-diethylaminopropanol, there is obtained $\delta$-dimethylaminobutyl $\alpha,\beta,\beta$-triphenylpropionate (Compound I).

Example 5

416 parts of $\alpha,\beta,\beta$-triphenylpropionyl chloride are dissolved in 880 parts of anhydrous benzene. 170 parts of $\gamma$-diethylaminopropanol are added over a period of 10 minutes. The mixture is refluxed for 2 hours and then the benzene is evaporated under vacuum. The residue is dissolved in 5000 parts of warm water. The aqueous solution is extracted with ether to remove neutral material, and then made alkaline with caustic potash. A granular precipitate results, which is removed by filtration, washed with water until free of alkali, and dried at 60–65° C. $\gamma$-Diethylaminopropyl $\alpha,\beta,\beta$-triphenylpropionate (Compound J) is recrystallized from petroleum ether in the presence of decolorizing charcoal, and forms rosettes of crystals melting at 86–87° C.

$\gamma$-Diethylaminopropyl $\alpha,\beta,\beta$-triphenylpropionate citrate is prepared by treating an ether solution of the base with a saturated ether solution of an equivalent amount of citric acid. The precipitate which forms is washed with ether by decantation, dried, and pulverized. A sample of this salt, on analysis, showed 2.26% nitrogen (calculated, 2.31%).

*Example 6*

53 parts of β-diethylaminoethyl α,β,β-triphenylpropionate (Example 2) and 16 parts of ethyl bromide are dissolved in 80 parts of methyl ethyl ketone. The solution is heated in a closed vessel for 21 hours at 100° C. The solution is cooled and diluted with ether. The precipitate which forms is broken up and collected on a filter and dried in a vacuum drier. The product, β-(α,β,β - triphenylpropionoxy)-ethyl-triethyl-ammonium bromide, melts at 60–70° C. A sample, on analysis, showed 2.69% nitrogen (calculated, 2.74%).

*Example 7*

A solution of 33 parts of α,β-ditolyl-β-phenylpropionic acid (prepared by the reaction of cinnamic acid dibromide and toluene in the presence of anhydrous aluminum bromide, according to the general method of Earl and Wilson, Journal of the Proceedings of the Royal Society of New South Wales, vol. 65, pages 178–184, 1932) and 13.6 parts of β-diethylaminoethyl chloride in 150 parts of dry isopropanol is refluxed for 5 hours. The isopropanol is stripped off under vacuum and residue is mixed with an excess of 50% caustic soda solution. The oily organic layer is separated and dried. There is obtained in this manner the β-diethylaminoethyl ester of α,β-ditolyl-β-phenylpropionic acid.

I claim:

1. A member of the group consisting of basic esters of the formula

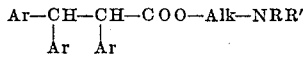

wherein Ar is a monocyclic aromatic hydrocarbon radical, Alk is an alkylene radical containing two to five carbon atoms and NRR' is an amino radical selected from the group consisting of di(lower alkyl) amino radicals and radicals wherein R and R' are joined to form a monocyclic saturated heterocyclic amino radicals, and salts thereof.

2. An aminoalkyl α,β,β - triphenylpropionate, having the formula

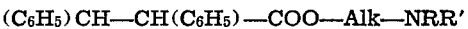

wherein Alk is an alkylene radical containing two to five carbon atoms, and R and R' are lower alkyl radicals.

3. An aminoalkyl α,β,β - triphenylpropionate, having the formula

wherein Alk is an alkylene radical containing two to five carbon atoms, and Z is a bivalent lower aliphatic radical which with N forms a monocyclic saturated heterocyclic amino radical.

4. A di(lower alkyl) aminoethyl α,β,β-triphenylpropionate.

5. A saturated heterocyclic amino-ethyl α,β,β-triphenylpropionate.

6. A di(lower alkyl) aminopropyl α,β,β-triphenylpropionate.

7. β-Diethylaminoethyl α,β,β-triphenylpropionate.

8. β-Diethylaminopropyl α,β,β - triphenylpropionate.

9. β-Piperidinoethyl α,β,β-triphenylpropionate.

CARL PETER KRIMMEL.

REFERENCES CITED

The following references are of record in the file of this patent:

UNITED STATES PATENTS

| Number | Name | Date |
|---|---|---|
| 2,079,962 | Miescher | May 11, 1937 |
| 2,404,588 | Martin et al. | July 23, 1946 |
| 2,423,025 | Holmes et al. | June 24, 1947 |

OTHER REFERENCES

Gilman et al.: J. Pharm. and Exp. Ther., vol. 74–74 (1942), pages 290–307.

Warner-Jauregg et al.: Ber. Deut. Chem., vol. 72, pages 1551–1561 (1939).